(12) United States Patent
Suzuki (10) Patent No.: US 7,815,194 B2
(45) Date of Patent: Oct. 19, 2010

(54) MECHANICAL SEAL AND MECHANICAL SEAL DEVICE

(75) Inventor: Osamu Suzuki, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 118 days.

(21) Appl. No.: 11/664,784

(22) PCT Filed: Nov. 25, 2005

(86) PCT No.: PCT/JP2005/021656

§ 371 (c)(1),
(2), (4) Date: Apr. 5, 2007

(87) PCT Pub. No.: WO2006/061997

PCT Pub. Date: Jun. 15, 2006

(65) Prior Publication Data

US 2008/0061514 A1 Mar. 13, 2008

(30) Foreign Application Priority Data

Dec. 7, 2004 (JP) ............................ 2004-354116

(51) Int. Cl.
*F16J 15/34* (2006.01)
(52) U.S. Cl. ...................................... 277/372; 277/365
(58) Field of Classification Search ................. 277/372, 277/373, 371, 361, 365
See application file for complete search history.

(56) References Cited

FOREIGN PATENT DOCUMENTS

| JP | 61-66267 | 5/1986 |
|----|----------|--------|
| JP | 7-71617 | 3/1995 |
| JP | 2002-174379 | 6/2002 |
| JP | 2003-314703 | 11/2003 |
| WO | WO 01/59337 | 8/2001 |

*Primary Examiner*—Thomas B Will
*Assistant Examiner*—Gilbert Y Lee
(74) *Attorney, Agent, or Firm*—H. Henry Koda; William L. Androlia (57) ABSTRACT

A mechanical seal 4 includes a rotary sealing ring 8 which is fixed to a rotary shaft body 2 and a stationary sealing ring 9 which is movably held to a tubular case body 1 in an axial direction thereof, and seals a space between inner and outer peripheral areas 5 and 18 of a relative rotation portion by means of the relative rotation of opposite end faces 21 and 27 of both sealing rings 8 and 9. A drive pin 24a which is engaged with a recessed portion 23 formed in an outer periphery of the stationary sealing ring 9 is fixedly supported to the case body 1 at both sides of a place engaging with the recessed portion 23 so as to prevent the stationary sealing ring 9 from rotating relatively to the case body 1. The drive pin 24a is made of a metal or plastic material according to the conditions of use. The rotary prevention function of the stationary sealing ring 9 is stably achieved by the drive pin 24a, and the plastic material that enables to prevent a contamination may be used as the constituting material of the drive pin 24a.

6 Claims, 6 Drawing Sheets

MECHANICAL SEAL AND MECHANICAL SEAL DEVICE

TECHNICAL FIELD

The present invention relates to a mechanical seal and a mechanical seal device such as a rotary joint in which a plurality of the mechanical seals are juxtaposed in an axial direction thereof.

BACKGROUND ART

There has been well known that a mechanical seal having a rotary sealing ring which is fixed to a rotary shaft body (such as a rotary shaft) rotatably driven and a stationary sealing ring which is movably held to a tubular case body (such as a seal case through which a rotary shaft concentrically penetrates) in an axial direction so as to seal the space between inner and outer peripheral areas of a relative rotation portion by means of the relative rotation of opposite end faces of both sealing rings (for example, refer to JP-A-2003-314703).

In such a mechanical seal, it is studied in a manner that ensures (that is, permits a relative movement within a predetermined range in the axial direction with respect to the case body) the following capability of the stationary sealing ring and that prevents the relative rotation of the drive pin on the case body by forming a recessed portion in the outer peripheral portion of the stationary sealing ring, attaching a drive pin to the case body by screwing or press-fitting the base end of the drive pin into a screwed hole or press-fitted hole formed in the case body, and engaging a front end of the drive pin with the recessed portion of the stationary sealing ring so as to relatively move in the axial direction (for example, refer to FIG. 1, and a second paragraph of paragraph number 0023 and a fifth paragraph of paragraph number 0025 of Patent Document 1).

Patent Document 1: Japanese Patent Application Publication No. 2003-314703

However, in a mechanism which prevents the rotation of such stationary sealing ring by the drive pin, since the drive pin is only cantilever-supported to the case body, it is difficult to effectively obtain a good mechanical seal during long terms, and following problems occur.

That is, since the base end of the drive pin is only screwed or press-fitted into the screwed hole or press-fitted hole formed in the case body, when a bending moment is applied to the front end engaging with the stationary sealing ring, it has a problem that a slack occurs between the base end and the screwed hole or press-fitted hole, and the drive pin is bended. Accordingly, the rotary prevention function of the stationary sealing ring (hereinafter, referred as "the function of the drive pin") is obtained by means of the drive pin. With the above described state, the sealing function is not adequately realized by the relative rotation of both the stationary sealing ring and the rotary sealing ring. In addition, if the drive pin is continuously used with such state, the drive pin tends to detach from the case body, and the base end of the drive pin which is screwed or press-fitted into the screwed hole or the press-fitted hole becomes damaged and broken. As a result, since the function of the drive pin is completely lost, the sealing function cannot be realized.

As above described, even though the drive pin is a small component in all of the mechanical seals and the function (the function of the drive pin) thereof may be overlooked, the drive pin has a significant effect on the sealing function of the mechanical seal. Therefore, if the function of the drive pin is lost, it requires that all the mechanical seals be replaced or repaired. Such problems are especially prominent in the mechanical seal device such as a multi-flow channel type rotary joint in which a plurality of the mechanical seals is juxtaposed. The reason is that a functional deterioration and loss of the drive pin in one mechanical seal is directly associated with the function deterioration and loss of the overall mechanical seal device.

In addition, as the above described, since the drive pin is only cantilever-supported to the case body, the drive pin must be configured by a metal having a high stiffness with respect to strength. Therefore, since the drive pin could be not applied to a situation in which a fluid contacting with the drive pin and metal ions should not be mixed, it has the problem that the use of the drive pin is considerably limited (For example, the mechanical seal used in a rotary equipment such as a surface polishing device for polishing semiconductor wafers by CMP (Chemical Mechanical Polishing) method, which requires a steps to prevent a high contamination).

The invention has been made in consideration of the above circumstances. It is therefore an object of the invention to provide a mechanical seal and a mechanical seal device which can effectively realize the function of the drive pin and can use a plastic material capable of preventing the contamination as the component of the drive pin.

DISCLOSURE OF THE INVENTION

According to a first aspect of the invention, a mechanical seal includes a rotary sealing ring which is fixed to a rotary shaft body and a stationary sealing ring which is movably held to a tubular case body in an axial direction. A space between inner and outer peripheral areas of a relative rotation portion is sealed by means of a relative rotation of opposite end faces of both sealing rings. Furthermore, a drive pin which is engaged with a recessed portion formed on an outer periphery of the stationary sealing ring is fixedly supported to the case body in both sides of a place engaging with the recessed portion so as to prevent the relative rotation of the stationary sealing ring on the case body. In the above-mentioned mechanical seal, the drive pin may be made of a metal or plastic material according to the use conditions.

According to a second aspect of the invention, a mechanical seal device includes a plurality of mechanical seals which are juxtaposed in the axial direction, and that each of the mechanical seals includes a rotary sealing ring fixed to a rotary shaft body and a stationary sealing ring movably held to a tubular case body in the axial direction so as to seal a space between inner and outer peripheral areas of a relative rotation portion by means of a relative rotation of opposite end faces of both sealing rings. Further, drive pins which are engaged with recessed portions formed on an outer periphery of the respective stationary sealing rings are fixedly supported to the case body on both sides of places engaging with the recessed portions so as to prevent the relative rotation of the stationary sealing rings on the case body. In the above-mentioned mechanical seal device, the drive pins of all the mechanical seals are commonly used by a drive bar. Further, the drive pin or drive bar made of a metal or plastic material may be used according to the use conditions.

A rotary joint which allows the fluid such as the drinking water, the purified water, the drug solution, the slurry solution, etc to flow into between the relative rotation members, in a feeding and discharging apparatus of a drinking water, a purified water, a drug solution, a slurry solution, etc or the CMP apparatus can be used as an example of such mechanical seal device. That is, the mechanical seal device is the rotary joint in which passage connecting spaces sealed by a pair of the mechanical seals are formed between an opposite peripheral surface of the rotary shaft body and case body so that first passages formed in the rotary shaft body communicate with second passages formed in the case body through the passage connecting spaces, respectively. In the above-mentioned rotary joint, when the plurality of the passages are required, sealing units including the pair of the mechanical seals which seal the passage connecting spaces are juxtaposed with plural class, and a plurality of passage connecting spaces are formed between an opposite peripheral surface of the rotary shaft body and case body so that the first passages formed in the rotary shaft body communicate with the second passages formed in the case body through each of the passage connecting spaces, respectively. In this case, the rotary sealing ring of the mechanical seal in one of the sealing units is commonly used in the mechanical seal in the other sealing unit adjacent to one of the sealing units. Accordingly, the simplification and miniaturization (shortening of the length thereof in the axial direction) of the structure can be achieved.

According to the mechanical seal and mechanical seal device of the invention, since the drive pin engaging with the stationary sealing ring is supported to the case body on both sides of the engaged portion thereof, the problems which occur in the cantilever-supported drive pin as described in introduction do not occur, the drive pin function (the rotary prevention function of the stationary sealing ring by means of the drive pin) is stably achieved, and the mechanical seal or mechanical seal device can be preferably operated for long periods. Further, since the drive pin made of a metal or plastic material having a lower strength than the metal can be used, it may be preferably used in a situation that requires prevention of contamination. Accordingly, the usage of the mechanical seal device can be considerably extended.

In addition, according to the mechanical seal in which a plurality of the mechanical seals is disposed in parallel, since the drive pin of all of the mechanical seals is commonly used by the drive bar, the structure of mechanical seal device can be considerably simplified as compared with the case in which the drive pins are provided in mechanical seals, respectively. Accordingly, the manufacture of the mechanical seal device has a considerable advantage in terms of lowering manufacturing cost.

REFERENCE NUMERALS 1 case body
2 rotary shaft body
3 first fluid passage
4 mechanical seal
4A sealing unit
5 passage connecting space (outer peripheral area of relative rotation portion)
6 first passage
7 second passage
8 rotary sealing ring
9 stationary sealing ring
10 supporting wall
10a through hole
11 supporting protrusion
11a through hole
18 cooling space (peripheral area of relatively rotary portion)
21 sealing end face
27 sealing end face
28 first fluid
29 cooling fluid

BEST MODE FOR CARRYING OUT THE INVENTION

Figure 1:
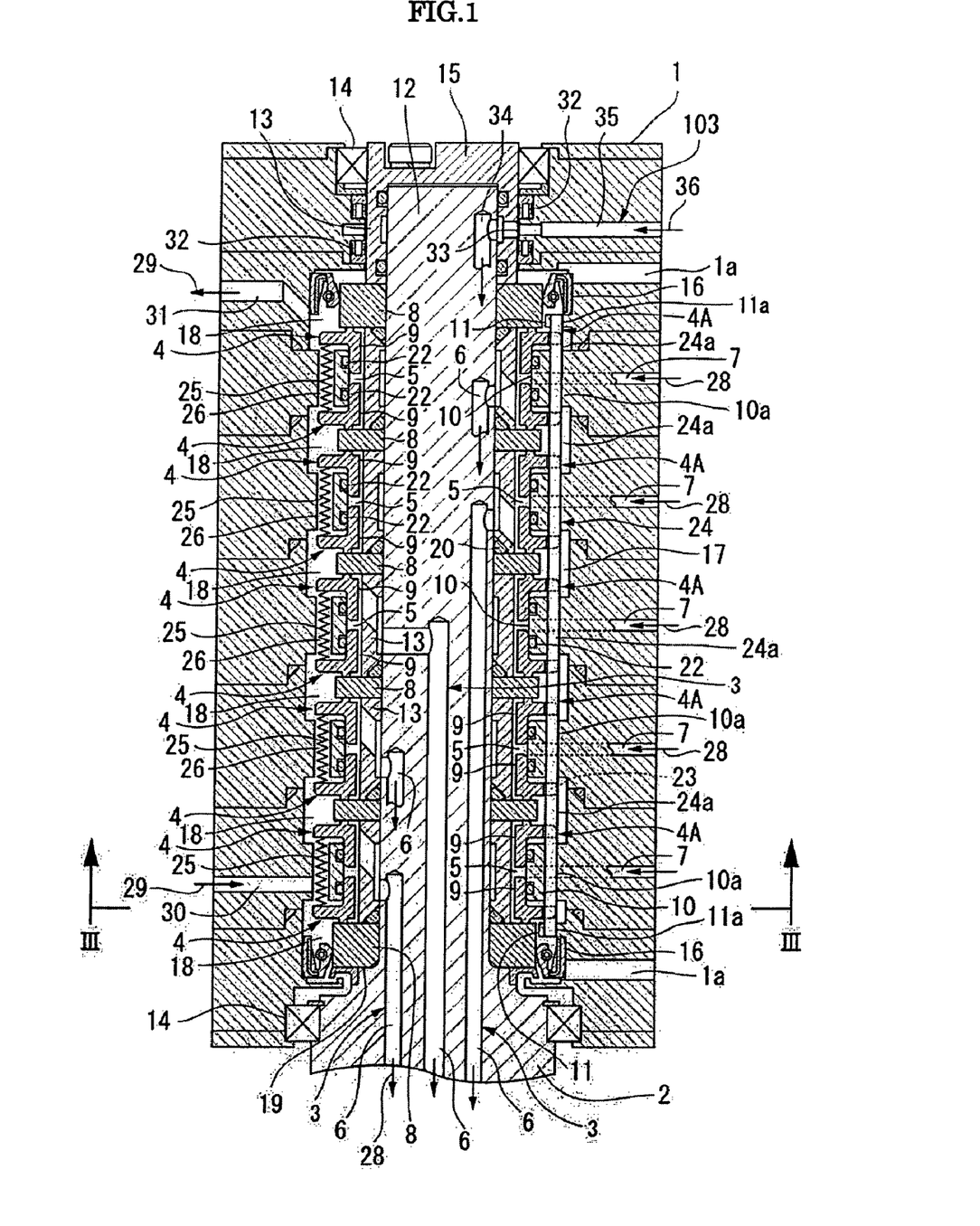
FIG. 1 is a front cross-sectional view showing an example of a mechanical seal device according to the invention.
Figure 2:
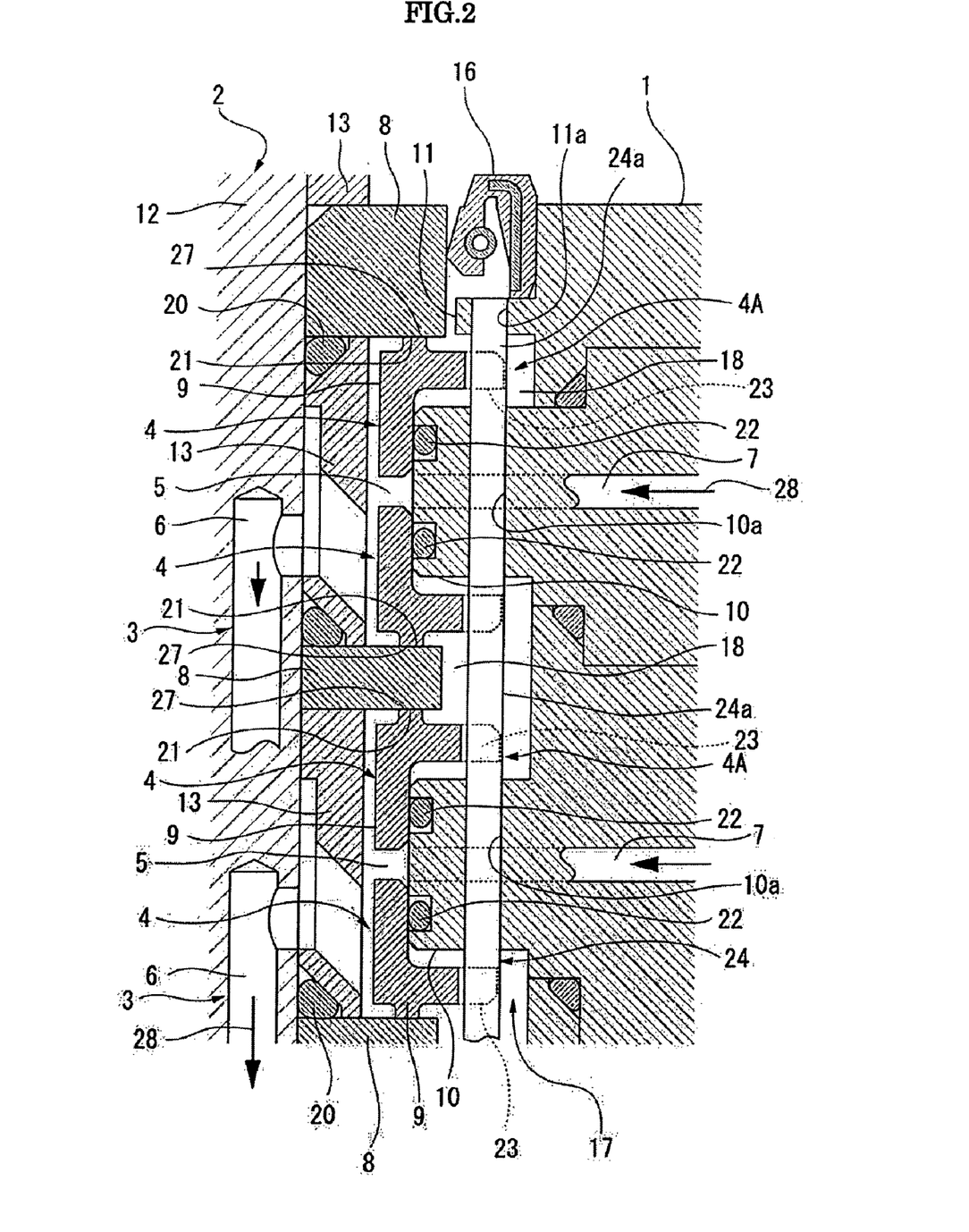
FIG. 2 is an enlarged front cross-sectional view showing a main part of the FIG. 1.
Figure 3:
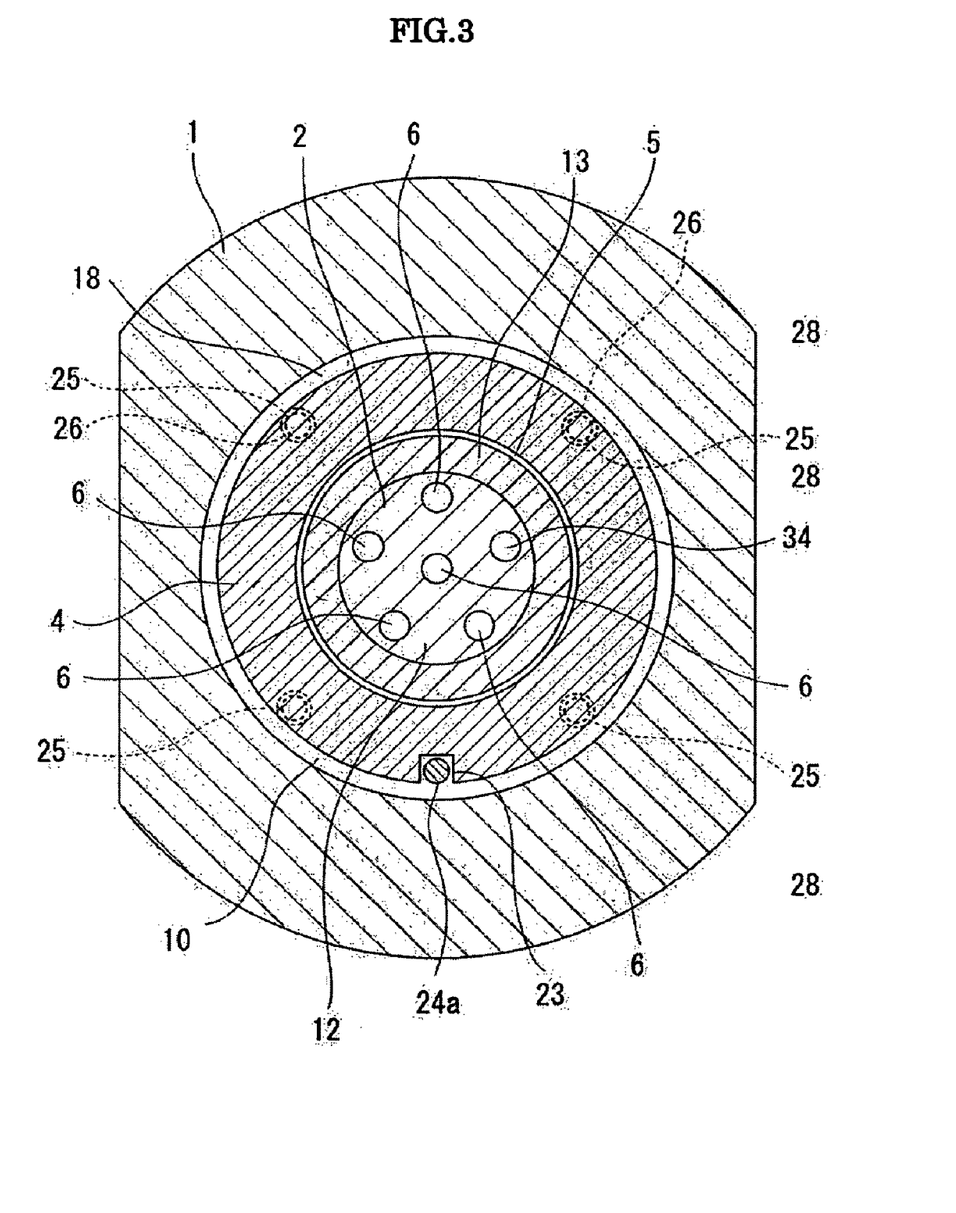
FIG. 3 is a traverse bottom view of the mechanical seal device according to the invention (the cross section is taken along line III-III in FIG. 1, III-III in FIG. 5, or III-III in FIG. 6).

FIG. 1 is a front cross-sectional view showing a rotary joint, an example of a mechanical seal device according to the invention, FIG. 2 is an enlarged front cross-sectional view showing the mechanical seal according to the invention, which is used in the rotary joint, and FIG. 3 is a traverse bottom view of the rotary joint (the cross section is taken along line III-III in FIG. 1). Further, a top and bottom referred to a following description imply the top and bottom in the FIGS. 1 and 2.

The mechanical seal device shown in FIG. 1 is a multi-flow channel type rotary joint which allows a plurality of fluids to flow between a main body of the device serving as a stationary-side member and a top ring or turn table serving as a rotary-side member in a CMP apparatus.

That is, as shown in FIG. 1, the rotary joint includes a tubular case body 1 mounted on the stationary-side member (main body of the CMP apparatus) and a rotary shaft body 2 mounted on the rotary-side member (the top ring or turn table). In addition, the rotary joint has a plurality (N) of first fluid passages 3 and a second fluid passage 103 formed in the both members so as to relatively connect the fluid passages with rotation.

As shown in FIG. 1, each of the first fluid passages 3 is a passage for allowing a first fluid 28 such as a slurry solution (for example, a wafer polishing solution) or water (for example, pure water for cleaning) to flow. Furthermore, each of the first fluid passages 3 includes a passage connecting space 5 which is sealed by a pair of mechanical seals 4 and 4 in an annular space formed between an opposite peripheral surface of the case body 1 and rotary shaft body 2, a first passage 6 which is formed in the rotary shaft body 2 and communicates with the passage connecting space 5, and a second passage 7 which is formed in the case body 1 and communicates with the passage connecting space 5. As shown in FIG. 1, the pair of the mechanical seals 4 and 4 sealing each of the passage connecting spaces 5 is oppositely disposed in the top and bottom direction. In order to seal N fluid passages 3, that is, N passage connecting spaces 5, N sets of a sealing unit 4A composed of the pair of mechanical seals 4 and 4 are juxtaposed in the axial direction. As shown in FIG. 2, each of the mechanical seals 4 includes a rotary sealing ring 8 which is fixed to the rotary shaft body 2 and a stationary sealing ring 9 which is held to the case body 1, but the rotary sealing ring 8 of the mechanical seal 4 in one sealing unit 4A and the rotary sealing ring 8 of the mechanical seal 4 in the other sealing unit 4A adjacent to the one sealing unit 4A are commonly used. That is, the number of the mechanical seal composing N sets of sealing units 4A is 2N, but it is required that the number of the rotary sealing ring is N+1 so as to form 2N mechanical seals 4. Of course, the number of the stationary sealing ring is 2N, which corresponds to the number of the mechanical seal. In addition, N is 5 in the FIG. 1.

As shown in FIG. 1, the case body 1 has a tubular structure in which an inner periphery has a circular section, and is attached to a stationary-side member of the CMP device and so on. As will be described later, N annular supporting walls 10 which are separated from each other in the axial direction (top and bottom direction) by a predetermined distance and a pair of supporting protrusions 11 and 11 which is located on both sides of the top and bottom thereof protrudes from the inner periphery of the case body 1. Furthermore, the case body 1 is divided into several sections in the top and bottom direction, and the divided sections are assembled by bolts (not shown) so as to be connected with each other.

As shown in FIG. 1, the rotary shaft body 2 includes columnar main body 12 and N+1 cylindrical holding portions 13 which are separated from each other by a predetermined distance and are fitted in the axial direction (top and bottom direction) in parallel. In addition, the rotary shaft body 2 is concentrically supported to the inner periphery of the case body 1 by a pair of bearings 14 and 14 so as to freely rotate. Further, the holding portion 13 located in the uppermost end constructs a peripheral wall of a cylindrical bearing-receiving body, which is fixed on an upper end of the main body 12. Furthermore, the bearings 14 and 14 are interposed between the outer periphery of the bearing-receiving body 15 and the inner periphery of the upper end of the case body 1, and between the outer periphery of the lower end of the main body 12 and the inner periphery of the lower end of the case body 1, respectively.

As shown in FIG. 1, an annular space 17, which is blocked by a pair of seal members 16 and 16, is formed between the opposite peripheral surface of the case body and the rotary shaft body (between the inner periphery of the case body 1 and the outer periphery of the rotary shaft body 2) that are concentric with each other. In this case, the pair of seal members 16 and 16 is separated from each other in the axial direction (top and bottom direction) by a predetermined distance. Each of the seal members 16 and 16 is, for example, an oil seal, which is fitted and fixed into the inner periphery of the case body 1, and seals a space between the case body 1 and the rotary sealing ring 8 by pressing the inner periphery thereof to the outer periphery of the uppermost rotary sealing ring 8 and the lowest rotary sealing ring 8 so as to be brought into contact with each other. Furthermore, on the top and bottom sides of the annular space 17 sealed by the seal members 16 and 16, the case body 1 is provided with drains 1a and 1a.

As shown in FIG. 1, the annular space 17 is sealed so as to divide N passage connecting spaces 5 and N+1 cooling spaces 18 by 2N end-face contact type mechanical seals 3 (N sets of sealing units 4A), which include N+1 rotary sealing rings 8 provided on the rotary shaft body 2, N supporting walls 10 formed in the case body 1, and a pair of the stationary sealing rings 9 provided on each of the supporting walls 10.

That is, as shown in FIG. 1, the rotary sealing rings 8 are fixed on the outer periphery of the rotary shaft body 2 in the axial direction at a regular distance so as to be fitted with the main body 12 of the rotary shaft body 2 and to be sandwiched by interposing each of O-rings 20 between a lower shoulder 19 of the main body 12 and the uppermost holding portion 13, and between the holding portions 13. As shown in FIG. 2, each of the rotary sealing rings 8 is an annular plate, and opposite end faces of adjacent rotary sealing rings 8 and 8 are composed of sealing end faces 21 and 21 (hereinafter, referred as first sealing end faces) which are smooth annular planes perpendicular to the axial direction.

As shown in FIG. 1, each of the supporting walls 10 is located between the opposite faces of the adjacent rotary sealing rings 8 and 8, and is an annular wall protruding from the inner periphery of the case body 1. That is, the rotary sealing rings 8 and the supporting walls 10 are alternately juxtaposed to each other in the axial direction (top and bottom direction).

A pair of top and bottom stationary sealing rings 9 and 9 is held to each of the supporting walls 10 and directly faces the first sealing end faces 21 and 21 which are the opposite end faces of the rotary sealing rings 8 and 8 located on both sides of the respective supporting walls 10 so as to move in the axial direction and not to rotate relative to each other. That is, as shown in FIG. 2, each of the stationary sealing rings 9 is fitted to the inner periphery of the supporting wall 10 with the O-ring 22 interposed therebetween to move in the axial direction, and is prevented being rotated (rotated relative to the case body 1) so as to move within predetermined range in the axial direction by a following rotary prevention mechanism.

As shown in FIGS. 2 and 3, in the both top and bottom sides engaging with recessed portions 23, such a rotation preventing mechanism is configured in a manner such that a drive pin 24a, which is engaged with the recessed portions 23 formed on the outer periphery of each of stationary sealing ring 9 so as to relatively move in the axial direction, is fixedly supported to the case body 1 so as to prevent the relative rotation of the stationary sealing ring 8 on the case body. In this example, one drive bar 24 is commonly used as the drive pins 24a for all of the mechanical seals 4, as shown in FIG. 1. That is, as shown in FIG. 1, the drive bar 24 of a long circular-section rod is fixedly supported to the case body 1 by inserting an intermediate portion of the drive pin 24 into a through hole 10a formed in each of the supporting walls 10 to be supported and inserting an end of the drive bar 24 into a through hole 11a formed in each of the supporting protrusions 11 to be supported. Furthermore, in the uppermost and lowest stationary sealing rings 9, the recessed portion 23 thereof is engaged with a portion of the drive bar (drive pin) 24a of which both ends are supported by the supporting protrusion 11 and the supporting wall 10 opposite to the supporting protrusion 11 so as to move in the axial direction, and in the other stationary sealing rings 9, the recessed portion 23 thereof is engaged with the portion of the drive bar (drive pin) 24a of which both ends are supported by the adjacent supporting walls 10 and 10 so as to move in the axial direction. In addition, the portion of the drive bar (drive pin) 24a of which both ends are supported by the adjacent supporting walls 10 and 10 is engaged with two stationary sealing rings 9 and 9.

Each of the stationary sealing rings 9, which is held to the case body 1 by the drive bar 24 so as to move in the axial direction, but not to rotate, is pressingly urged to the rotary sealing ring 8 by a plurality of coil springs 25. That is, as shown in FIGS. 1 to 3, since each of the springs 25 is interposed between the stationary sealing rings 9 and 9 which are held to the supporting wall 10 in a state in which the spring 25 is inserted and held into the through hole 26 formed in the supporting wall 10, it is studied that the spring 25 functions as a common urge means of the both stationary sealing rings 9 and 9. The end face of each stationary sealing ring 9 is configured as an annular second sealing end face 27 pressingly contacting with the first sealing end face 21 by spring 25, so as to be concentric with the first sealing end face 21.

Accordingly, in each of the mechanical seals 4, the first sealing end face 21 and the second end face 27 are slidingly contacted with each other so as to relatively rotate in accordance with the rotation of the rotary shaft body 2, and seal the inner peripheral region and outer peripheral region of a sliding contact portion for relatively rotating by the same function as the well-known end face contact type mechanical seal. By this configuration, as shown in FIG. 1, the annular space 17 is partitioned by the pair of rotary sealing rings 8 and 8 adjacent to each other, the pair of stationary sealing rings 9 and 9 pressingly contacting with the pair of rotary sealing rings 8 and 8, N pass connecting spaces 5 of the inner peripheral region surrounded by the holding portion 13 serving as the outer peripheral portion of the rotary shaft body 2, and N+1 cooling spaces 18 of the outer peripheral region which seal a space between the pass connecting spaces 5 and are divided by the supporting walls 10 in the sliding-contact portion for relative rotation of the both sealing end faces 21 and 27.

As shown in FIGS. 1 and 3, N first passages 6 which are open at each of the passage connecting spaces 5 are formed in the rotary shaft body 2 without intersecting to each other. That is, as shown in FIG. 1, one end of each first passage 6 is open at the passage connecting space 5 through the holding portion 13 from the outer peripheral portion of the rotary shaft body 2, and the other end of the first passage 6 is open at the bottom end of the main body 12. The other end of each first passage 6 is connected to a rotary-side flow passage formed in the rotary-side member (a top ring or turn table).

As shown in FIG. 1, N second passages 7 are formed in the case body 1 in the radial direction thereof without intersecting to each other. One end of each second passage 7 is open at the passage connecting space 5 through the holding portion 10, and the other end of the second passage 7 is open at the outer peripheral portion of the case body 1. The other end of each second passage 7 is connected to a stationary-side flow passage formed in the stationary-side member (main body of the CMP apparatus).

Accordingly, N fluid passages 3 are independently formed in the case body 1 and rotary shaft body 2, and allow the first passage 6 and second passage 7 to be connected through the passage connecting space 5 so as to relatively rotate. In addition, as indicated by arrows in FIG. 1, N kinds (the same kind or different kinds) of first fluids 28 flow without mixing in the first passages 6 from the second passages 7 and in the second passages 7 from the first passages 6.

As shown in FIG. 1, all of the cooling spaces 18 communicate with each other by means of through holes 26 formed in the respective supporting walls 10. As shown in FIG. 1, the upper and lower of the case body 1 are provided with a supplying passage 30 and a discharging passage 31 which supplies and discharges a cooling fluid 29, respectively, and it is studied that the cooling fluid 29 cools sliding-connection heat of the sealing end faces 21 and 27 in each mechanical seal 4 by passing through all of the cooling spaces 18. For example, a room-temperature clean water or pure water is generally used as the cooling fluid 29.

As shown in FIG. 1, a second fluid passage 103 is a passage for allowing a second fluid 36 such as a wafer pressing air or air-blowing air to flow, and is composed of a passage connecting space 33 sealed by a pair of elastic sealing rings 32 and 32 in an annular space formed in the opposite peripheral surfaces between the case body and the rotary shaft body 1 and 2, a first passage 34 formed in the rotary shaft body 2 so as to communicate with the passage connecting space 33, and a second passage 35 formed in the case body 1 so as to communicate with the passage connecting space 33.

Figure 4:
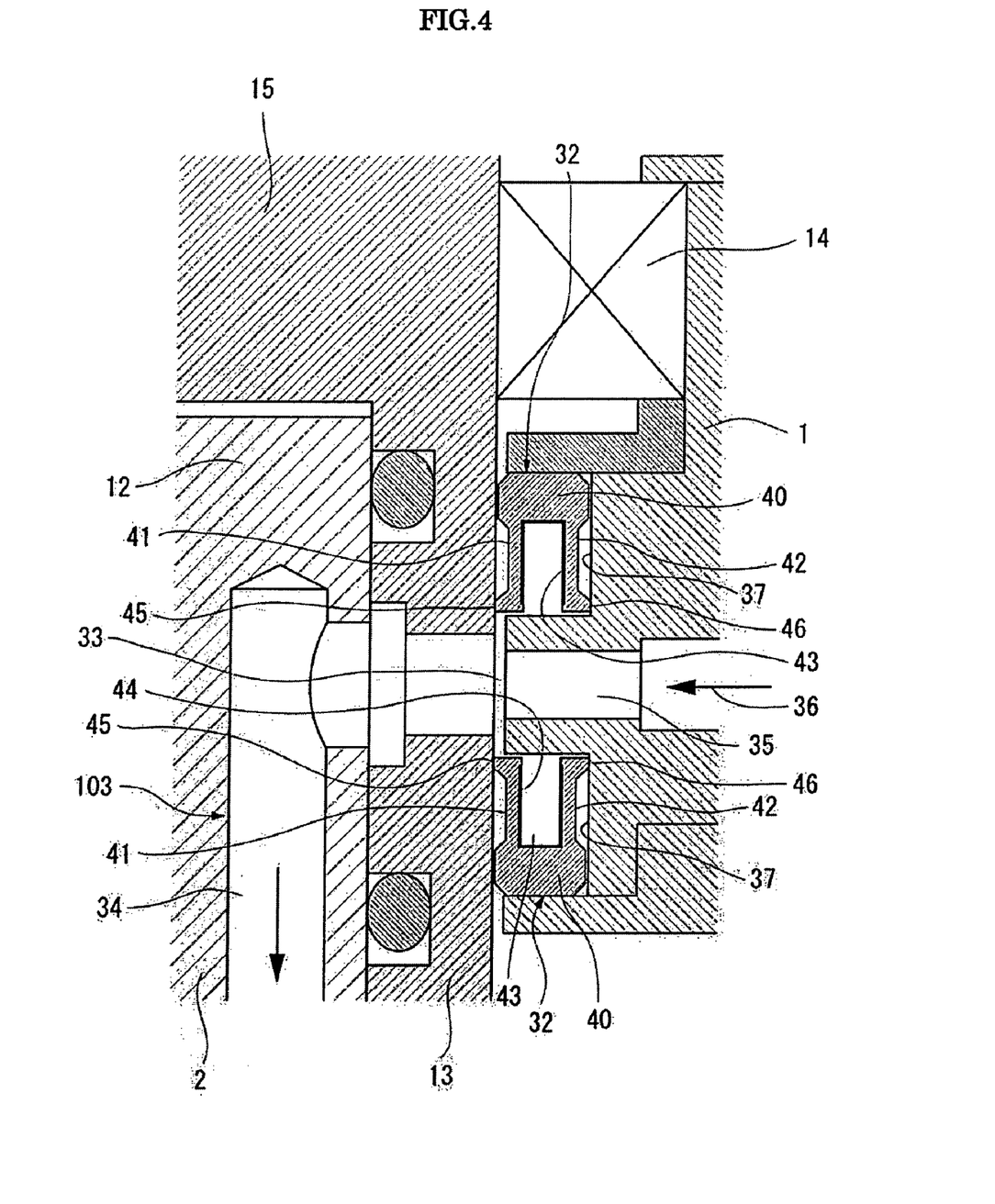
FIG. 4 is an enlarged front cross-sectional view showing a part other than the main part shown in FIG. 2 as the main part of the FIG. 1.

Even though FIG. 4 is an enlarged front cross-sectional view showing a main part of the FIG. 1, as shown in FIG. 4, each of the elastic sealing rings 32 has a U-shaped annular body including an annular main body 40, an tubular inner and outer peripheral lips 41 and 42 protruding in the axial direction from the body 40, a spring member 44 disposed in an annular groove 43 between the inner and outer peripheral lips 41 and 42. In addition, each of the elastic sealing rings 32 is engaged with an annular recessed portion 37 formed on the inner periphery of the case body 1 opposite to a peripheral wall (holding portion) 13 of the bearing receiving body 15 so as to be held. As shown in FIG. 4, since both the elastic sealing rings 32 and 32 are symmetrically disposed in a manner such that the annular grooves 43 and 43 are opposite to each other, the annular passage connecting space 33 is formed in the opposite peripheral surface between the case body 1 and the peripheral wall 13 of the bearing receiving body 15.

When the fluid 36 is supplied to the passage connecting space 33, the fluid 36 is flown into the annular grooves 43 and 43 of the elastic sealing rings 32 and 32. Accordingly, in the axial direction, since both sealing rings 32 and 32 are pressed in the direction of being separated from each other by a pressure of the fluid 36, the main bodies 40 and 40 are thrust into the side of the annular recessed portions 37 and 37, and in the radial direction, the inner and outer peripheral lips 41 and 42 of each sealing ring 32 are pressed to transform by a pressure of the fluid 36 in the direction in which a radial interval thereof broadens. That is, since the contact pressure applied to the seal surface (the outer peripheral surface of the peripheral wall of the bearing receiving body 15 and the inner peripheral surface of the annular recessed portion 37) by the seal portions (tip ends of the lips 41 and 42) 45 and 46 of each sealing ring 32 increases by the pressure of the fluid 36 flown into the annular groove 43, the sealing function caused by the elastic sealing ring 32 is sufficiently realized. An increasing rate of such contact pressure is proportional to the pressure of the fluid 36 supplied to the passage connecting space 36. Accordingly, the contact pressure, that is, a sealing force is varied proportionally according to the pressure of the fluid 36, even though the pressure of the fluid 36 is a high or is fluctuated, a reliable and excellent sealing function is realized by the elastic sealing rings 32 and 32, and an excellent fluid flux in the second fluid passage 103 is realized without leakage.

As shown in FIG. 1, one end of the first passage 35 communicates with the passage connecting space 33 through the holding portion 13 (the peripheral wall of the bearing receiving body 15) from the outer periphery of the rotary shaft body 2, and the other end of the first passage 35 communicates with the lower end of the main body 12 of the rotary shaft body 2. The other end of the first passage 35 communicates with the rotary-side flow passage formed in the rotary-side member (top ring or turn table). In addition, one end of the second passage 36 communicates with the passage connecting space 33 through the case body 1 in the circumferential direction, and the other end of the second passage 36 communicates with outer periphery of the case body 1. The other end of the second passage 36 is connected to the stationary-side flow passage formed in the stationary-side member (main body of the CMP apparatus). Furthermore, the second fluid passage 103 is used so as to flow the gas 36, for example, the wafer pressure air or air-blow air.

Meanwhile, the sealing means 4 and 32 are used in the rotary joint according to an property of the fluids 28, 29 and 36 to be sealed, but it is necessary that a constituting material of the respective members of the rotary joint be selected in consideration of a function and mechanical strength demanded to the members, and be also selected in consideration of the property and a purpose of use of the fluids 28, 29 and 36. Accordingly, it is preferred that the constituting material of the respective members of the rotary joint be selected as an inactive material against the fluids 28, 29 and 36. The inactive constituting material against the fluids 28, 29 and 36 is determined in consideration of a relationship of the property and use conditions (such as an avoidance of the metal pollution). For example, when the fluids 28, 29 and 36 must be prevented from the metal pollution, a ceramics or plastic not eluting a metal ingredient nor producing a metal powder by contacting with the fluids 28, 29 and 30 is used as the inactive constituting material. Furthermore, when the fluid 28 flowing into the first fluid passage 3 is a slurry fluid containing a solid ingredient such as an abrasive grain, the ceramics and plastic which are not dusted by contacting with the contained solid ingredient are used as the constituting material of the member to be contacted with the fluids 28 and 36. When the fluids 28 and 36 which flow into the first fluid passage 3 or the second fluid passage 103 are a high-temperature fluid, the ceramics and plastic having heat resistance are used as the constituting material of the member to be contacted with the fluid 28 and 36, and when the fluids 28 and 36 are a corrosive fluid, the ceramics and plastic having a corrosion resistance or chemical resistance are used as the constituting material.

Accordingly, in general, it is preferred that the sealing rings 8 and 9 be made of a ceramics such as a silicon carbide or aluminum oxide which would rarely produce the abrasive powder caused by contact. Naturally, according to the use conditions, it is possible that the sealing rings 8 and 9 are made of an engineering plastic to be described later. In addition, according to the property and the purpose of use of the fluids, it is preferred that fluid contacting portions (including the portions which are likely to contact the fluids) other than the sealing rings 8 and 9 be made of an engineering plastic such as a PEEK, PES and PC which does not produce a particle by contacting with the solid ingredient such as the abrasive powder and has an excellent dimensional stability and heat resistance during the process or a fluorine resin such as a PTFE, PFA, PEP and PVDF having excellent corrosion resistance and chemical resistance. Furthermore, cases in which the portions to be contacted with the fluids 28 and 36 in the fluid passages 3 and 103 are made of selected materials are classified into two cases. One case is that the member (for example, the overall case body 1 or the main body 12 of the rotary shaft body 2) in which the fluid passages 3 and 103 are formed or the portion (for example, the portion in which the second passages 7 and 37 are formed in the case body 1 or the main body 12 of the rotary shaft body 2 in which the first passages 6 and 34 are formed) is made of a selected material layers, and the other case is that only the portions contacting with the fluids 28 and 36 (for example, inner walls of the passages 6, 7, 34, and 35) are made of a selected material by coating and press fitting. In particular, when the fluid passages 3 and 103 are formed in the member or portion (for example, the main body 12 of the rotary shaft body 2) which should be made of a metal such as stainless steel from a point of view of, for example, mechanical strength, the latter case is useful. In addition, since the drive pin 24a or drive bar 24 is disposed in the cooling spaces 17 shielding the distance between the first fluid passages 3 so as to seal by means of the mechanical seal 4, and comes into contact with only the cooling fluid 29, even though the drive pin 24a or drive bar 24 is made of a metal, metal pollution in the first fluid 28 can be avoided. However, in order to make assurance doubly sure on the avoidance of metal pollution of the first fluid 28 (for example, in order to realize the avoidance of metal pollution, even when a mixture of both fluids 28 and 29 resulting from the deterioration of the sealing function of the mechanical seal 4 occurs), it is preferred that the drive pin 24a or drive bar be made of a plastic material such as the engineering plastic. Furthermore, in the elastic sealing ring 32, the U-shaped annular body including the main body 40 and the inner and outer peripheral lips 41 and 42 is integrally molded with an elastic material such as plastic and rubber, but the elastic material is selected in consideration of the sealing conditions. For example, when the temperature of the fluid 36 to be sealed by means of the elastic sealing ring 32 is high, the elastic material having heat resistance is used, and when the fluid 36 has corrosive properties, the elastic material having the corrosion resistance is used. However, in general, it is preferred that for example, a fluorine resin such as a polytetrafluoroethylene (PTFE) having self-lubricating properties and low frictional properties (frictional coefficient of about 0.2 to 0.3), or an elastic composite, which is mixed at least one kind of a filling material such as a glass fiber, carbon fiber and molybdenum disulfide with the fluorine resin, be used. As such an example, an elastic composite having an excellent low frictional property and abrasion resistance, in which the glass fiber, molybdenum disulfide or polyimide is mixed into the polytetrafluoroethylene, is used.

According to the rotary joint, that is, the mechanical seal configured as described above, since the N first fluid passages 3 and one of the second fluid passage 103 are independently formed, N+1 kinds of the fluids 28 and 36 can be satisfactorily flown into the space between the rotary-side fluid passage and the stationary-side fluid passage without mixing, the flowing states thereof are separately controlled.

And then, in the mechanical seal 4 which seals the relative rotation portion (passage connecting space 5) of the respective first fluid passages 3, the drive pin 4a is supported (support the both ends) to the holding wall 10 and holding protrusion 11 on both sides in which the drive pin 4a is engaged with the stationary sealing ring 8. Accordingly, even though the drive pin 4a is made of a plastic having a lower strength than a metal as well as a metal, the problems as described in the introduction do not occur, and the function of drive pin is stably realized. As a result, the deterioration and loss of sealing function resulting from the deterioration and loss of the function of drive pin does not occur, and the first fluid 28 can satisfactorily flow. In addition, in general, in order to prevent the deterioration and loss of sealing function, it is studied in a manner that a plurality of recessed portions 23 are formed in the stationary sealing ring 9, and the drive pin 24a is engaged with each of the recessed portions 23. However, as described above, if the drive pin 24a is set as both end supporting structures, the function of the drive pin is prevented from deteriorating without providing a plurality of drive pins 24a, and the rotation of the stationary sealing ring 9 is sufficiently prevented by means of the one drive pin 24a. Accordingly, the structure of mechanical seal can be simplified.

Further, since the drive pin 24a of all the mechanical seals 4 are commonly used by one drive bas 24, the structure of mechanical seal can be simplified as compared with the case in which the drive pins 24a are provided in the mechanical seals 4, respectively. In particular, in the mechanical seal such as the rotary joint requiring the plurality of mechanical seals 4, as described above, since the rotation of the stationary sealing ring 9 is prevented by means of one drive pin 24a, such effects (simplification of the mechanical seal structure) are significant.

However, in the mechanical seal 4, the contacting portions (sealing end face) of the sealing rings 8 and 9 is susceptible to being burned by heat generation, and even though the first fluid 28 to be sealed is gas of a liquid, the risk of being burned increases if the first fluid 28 is dried by a suction-exhaust. However, in the above-described rotary joint, the sealing rings 8 and 9, and the contacting portions are cooled by cooling fluid flowing in the cooling spaces 18. As a result, the above-described risk of being burned does not occur. Accordingly, even when the first fluid 28 is gas or is used under the dry condition, the relative rotation for sliding-contacting of the sealing rings 8 and 9 is smoothly operated. Accordingly, an excellent sealing function is realized.

Meanwhile, in the rotary joint requiring a plurality of the fluid passages, when the mechanical seal 4 is employed as the sealing means in all of the fluid passages, all the length (length in the axial direction) of the rotary joint is increased. However, it is not always necessary to seal the fluid passage by using the advanced sealing means such as the mechanical seal 4 depending on the properties of the fluid to be flowed. For this reason, in the above-described rotary joint, different sealing means 4 and 32 are used according to the properties of the fluid 28 and 36 to be sealed in the first fluid passage 3 and the second fluid passage 103. Furthermore, in the case of the second fluid 36, which does not required to be sealed by the advanced sealing means such as the mechanical seal 4, the small-scaled elastic sealing ring 32 having a simple structure as compared to the mechanical seal 4, can be employed as the sealing means. As a result, the length of the rotary joint is shortened as much as possible, and the miniaturization and structure simplification of the rotary joint can be effectively achieved. In addition, the number of the second fluid passages 103 to be sealed by the elastic sealing rings 32 and 32 can be determined according to the need. When a plurality of the second fluid passages 103 is provided, the elastic sealing ring 32 of each second fluid passage 103 can be commonly used as one sealing ring 32 of the other second fluid passage 103 positioned adjacent to each other.

In addition, the mechanical seal or mechanical seal device according to the invention is not limited to the above-described exemplary embodiments, but may be properly modified without departing from the scope of the invention.

Figure 5:
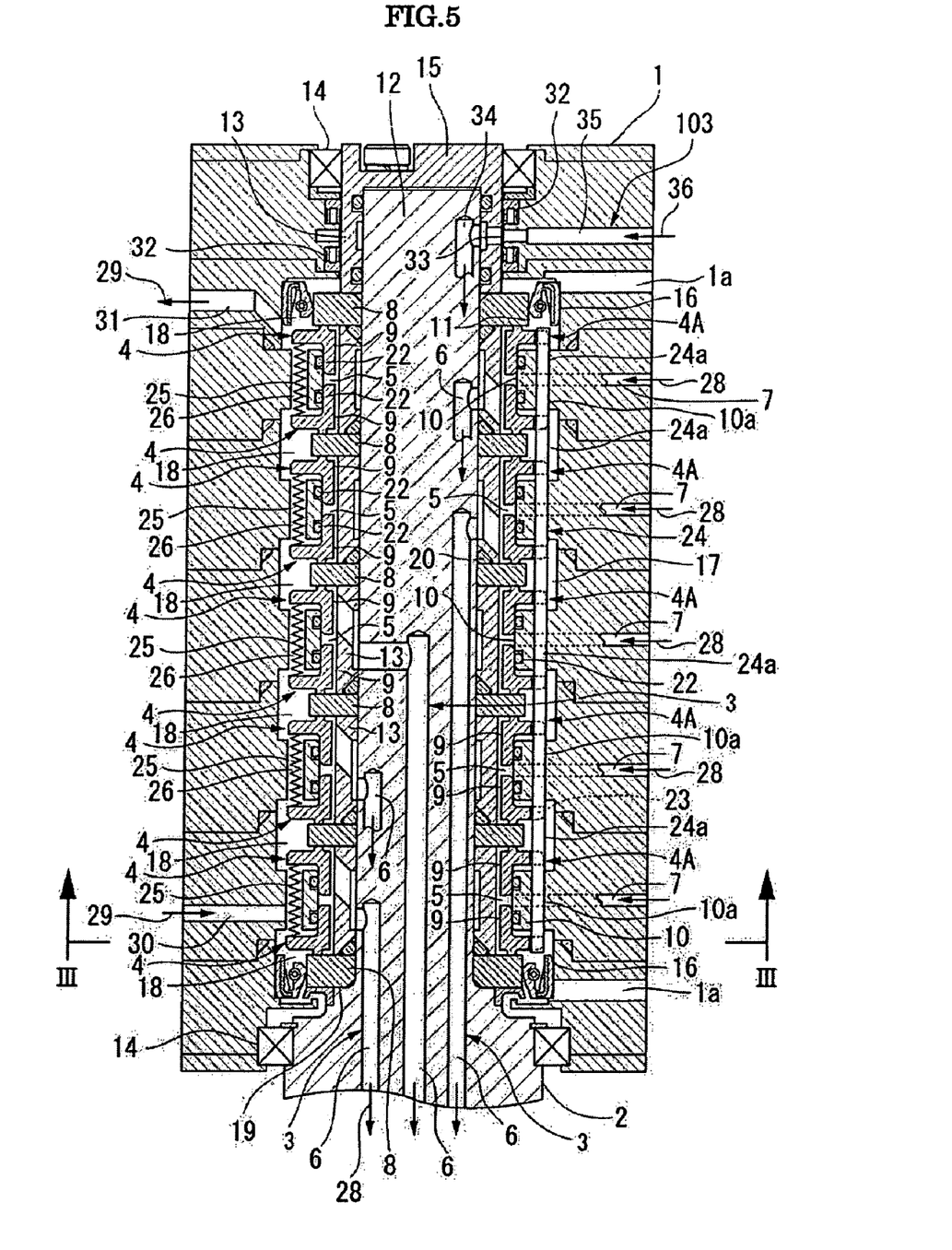
FIG. 5 is a longitudinal elevation view showing a modification example of the mechanical seal device according to the invention.
Figure 6:
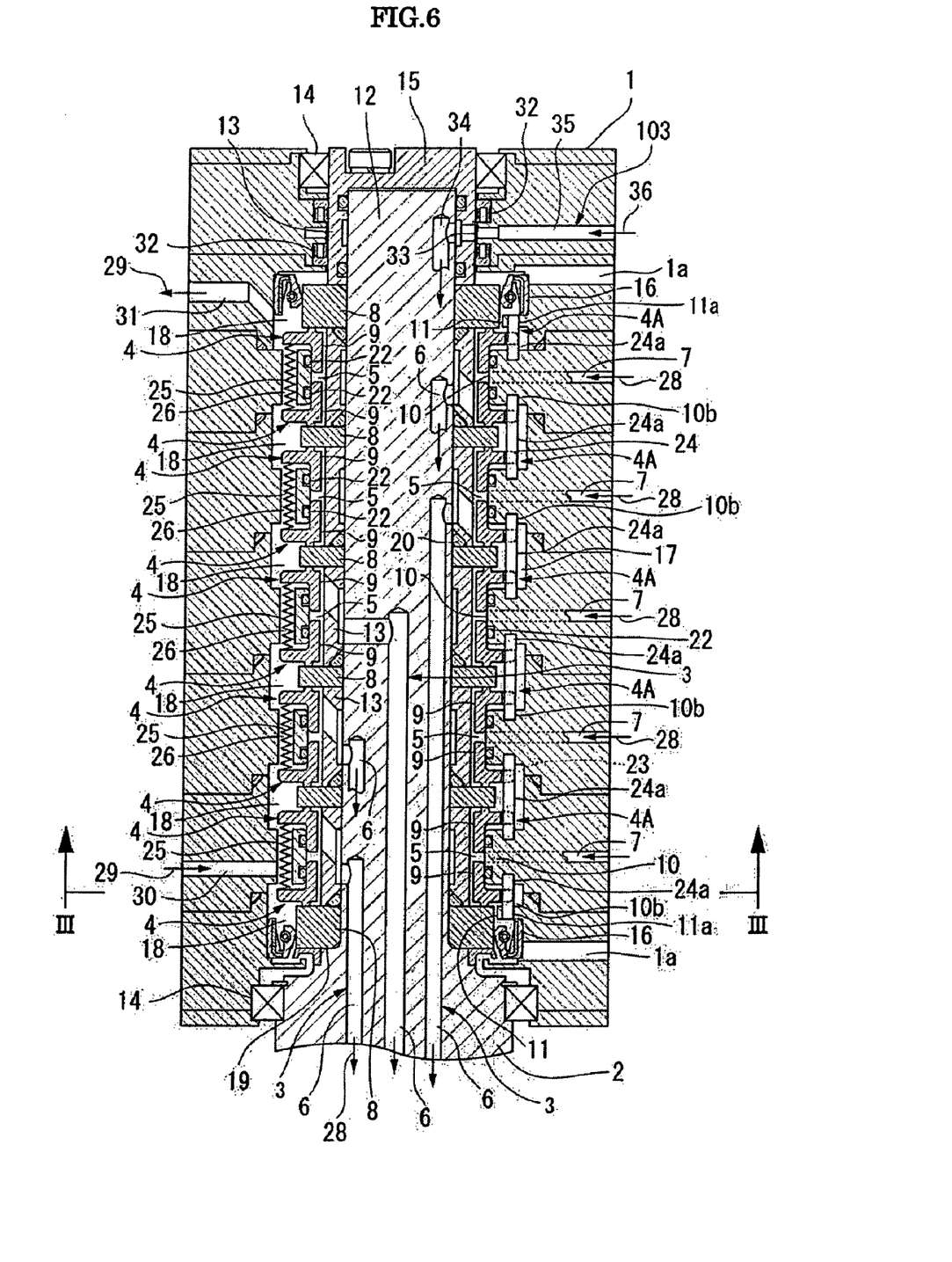
FIG. 6 is a front cross-sectional view showing another modification of the mechanical seal device according to the invention.

For example, in the above described rotary joint, as shown in FIG. 5, both ends of the drive bar 24 are not supported to the case body 1, and in the mechanical seals (the uppermost and lowest mechanical seals) 4 and 4 located at both ends of the mechanical seal groups, each of the stationary sealing rings 9 may be engaged with the end of the drive bar 24 protruding from the supporting wall 10. In this case, the drive pins 24a and 24a engaging with both stationary sealing rings 9 and 9 have a cantilever-supported structure, respectively. However, since the drive pins 24a and 24a are both ends of the drive bar 24 which is penetrated into the supporting wall groups 10 so as to be supported, it differs from the case that a base end of the drive pin is fixed, and the problems as described in the introduction do not occur. In addition, as illustrated in FIG. 6, it may be employed any one of structures that the drive pins 24a of all of the mechanical seals 4 are independent drive pin 24a, respectively, the plurality of the drive bar 24, and one or the plurality of the drive pin 24a or one or the plurality of the drive bar 24.

Furthermore, the invention is applicable to one the mechanical seal or at least one the mechanical seal selected from a plurality of the mechanical seals configuring the seal device, and is applicable to a mechanical seal other than the rotary joint.

The invention claimed is:

1. A mechanical seal device comprising:
a plurality of mechanical seals which are juxtaposed in an axial direction, each of the mechanical seals having a rotary sealing ring fixed to a rotary shaft body and a stationary sealing ring movably held to a tubular case body in the axial direction thereof so as to seal a space between inner and outer peripheral areas of a relative rotation portion by means of the relative rotation of opposite end faces of both the sealing rings, wherein
for all of said plurality of mechanical seals that form said mechanical seal device, a single drive bar, which is respectively engaged with recessed portions formed on an outer periphery of the stationary sealing rings, is fixedly supported to the case body at both ends of said single drive bar so as to prevent the stationary sealing rings from rotating relatively to the case body.

2. The mechanical seal device according to claim 1, wherein the drive bar is made of a metal or a plastic material.

3. The mechanical seal device according to any one of claims 1 or 2, wherein the mechanical seal device is a rotary joint, wherein the rotary joint is so configured that a passage connecting space sealed by a pair of the mechanical seals is formed between opposite peripheral surfaces of the rotary shaft body and the case body so that a first passage formed in the rotary shaft body communicates with a second passage formed in the case body through the passage connecting space.

4. The mechanical seal device according to claim 3, wherein the rotary joint is so configured that sealing units, each of which is composed of a pair of the mechanical seals to seal the passage connecting space, are juxtaposed in plural so as to form a plurality of passage connecting spaces between opposite peripheral surfaces of the rotary shaft body and the case body so that a plurality of the first passages formed in the rotary shaft body communicate with a plurality of the second passages formed in the case body through their respective passage connecting spaces.

5. The mechanical seal device according to claim 4, wherein one of the mechanical seals in each sealing unit shares the rotary sealing ring of the adjacent one of the mechanical seals in the mutually adjacent sealing unit.

6. The mechanical seal device according to claim 2, wherein said drive bar is made of engineering plastic.

* * * * *